US012702983B2

(12) United States Patent
Olson et al.

(10) Patent No.: US 12,702,983 B2
(45) Date of Patent: Aug. 11, 2026

(54) MILLING APPARATUS AND METHOD

(71) Applicants: Roy Olson, Sioux Falls, SD (US); Joshua Tracy, Harrisburg, SD (US); Alex Pearson, Harrisburg, SD (US)

(72) Inventors: Roy Olson, Sioux Falls, SD (US); Joshua Tracy, Harrisburg, SD (US); Alex Pearson, Harrisburg, SD (US)

(73) Assignee: Pearson Incorporated, Sioux Falls, SD (US)

( * ) Notice: Subject to any disclaimer, the term of this patent is extended or adjusted under 35 U.S.C. 154(b) by 272 days.

(21) Appl. No.: 18/389,424

(22) Filed: Nov. 14, 2023

(65) Prior Publication Data

US 2024/0173721 A1 May 30, 2024

Related U.S. Application Data

(60) Provisional application No. 63/428,160, filed on Nov. 28, 2022.

(51) Int. Cl.
*B02C 4/42* (2006.01)
*B02C 4/02* (2006.01)
*B02C 25/00* (2006.01)

(52) U.S. Cl.
CPC . *B02C 4/42* (2013.01); *B02C 4/02* (2013.01)

(58) Field of Classification Search
CPC .............. B02C 4/42; B02C 4/02; B02C 25/00
See application file for complete search history.

(56) References Cited

U.S. PATENT DOCUMENTS

| | | | | |
|---|---|---|---|---|
| 5,379,948 A * | 1/1995 | Teppo | B02C 23/14 241/24.31 |
| 10,322,487 B1 * | 6/2019 | Hansen | B24B 41/02 |
| 2020/0188925 A1 * | 6/2020 | Tracy | B02C 4/02 |

* cited by examiner

*Primary Examiner* — Mohammed S. Alawadi
(74) *Attorney, Agent, or Firm* — Jeffrey A. Proehl; Woods, Fuller, Shultz & Smith PC

(57) ABSTRACT

A system for grinding particles may include a roller mill apparatus with a pair of mill rolls, a motor assembly for rotating the mill rolls, and a controller assembly for controlling aspects of operation of the roller mill apparatus. The controller assembly may include a size detection sensor for detecting a particle size of material moving through the apparatus, and processing circuitry comparing a current particle size value with a target particle size value. The processing circuitry may execute instructions to compare the current particle size value to the target particle size value, and adjust a magnitude of a differential in rotational speeds of the mill rolls based upon the comparison of the current particle size value to the target particle size value to cause a future particle size value to move closer to the target particle size value.

15 Claims, 3 Drawing Sheets

MILLING APPARATUS AND METHOD

REFERENCE TO RELATED APPLICATIONS

This non-provisional application claims the priority benefit of U.S. Provisional Patent Application No. 63/428,160, filed Nov. 28, 2022, which is hereby incorporated by reference in its entirety.

BACKGROUND

Field

The present disclosure relates to grinding apparatus and more particularly pertains to a new milling apparatus and method for adjusting components of the apparatus to better achieve a desired particle size distribution.

SUMMARY

In one aspect, the present disclosure relates to a system for grinding particulate material comprised of particles, and the system may comprise a roller mill apparatus configured to grind particulate material passing through the roller mill apparatus. The roller mill apparatus may comprise a roller mill frame, and a pair of mill rolls which are rotatably mounted on the roller mill frame for rotation with respect to the roller mill frame and which form a gap therebetween through which the particulate material passes. The roller mill apparatus may also include a motor assembly configured to rotate the mill rolls with respect to the roller mill frame, and a controller assembly configured to control aspects of operation of the roller mill apparatus. The controller assembly may comprise a size detection sensor configured to detect a particle size associated with particles of the particulate material passed through the gap between the pair of mill rolls and processing circuitry configured to compare a current particle size value with a target particle size value. The processing circuitry may be configured to execute instructions to compare the current particle size value to the target particle size value and adjust a magnitude of a differential in rotational speeds of the mill rolls based upon the comparison of the current particle size value to the target particle size value to cause a future said current particle size value to move closer to the target particle size value.

In another aspect, the present disclosure relates to a method of operating a roller mill apparatus including a pair of rotatable mill rolls defining a gap therebetween through which particulate material is passed. The method may comprise retrieving a target particle size value, receiving a current particle size value from a size detection sensor of the roller mill apparatus, and determining if a difference between the current particle size value and the target particle size value is equal to or greater than a tolerance value. The method may further include, if the difference between the current particle size value and the target particle size value is less than or equal to the tolerance value, then continuing a current rotational speed of each of the mill rolls; and if the difference between the current particle size value and the target particle size value size is greater than the tolerance value, then adjusting of the magnitude of any differential in the rotational speeds of the mill rolls.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, or the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
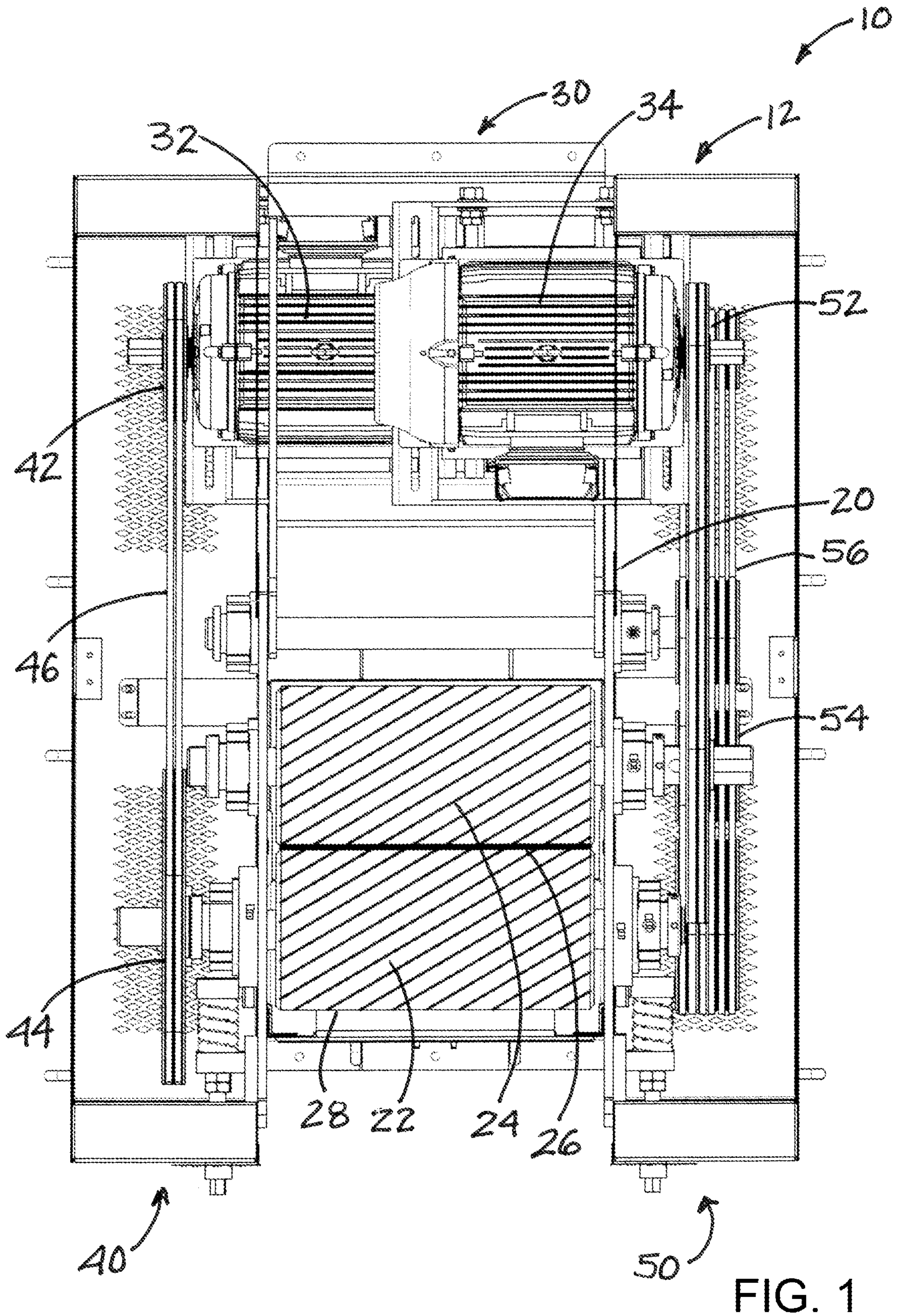
FIG. 1 is a schematic top sectional view of elements of a new milling apparatus according to the present disclosure.
Figure 2:
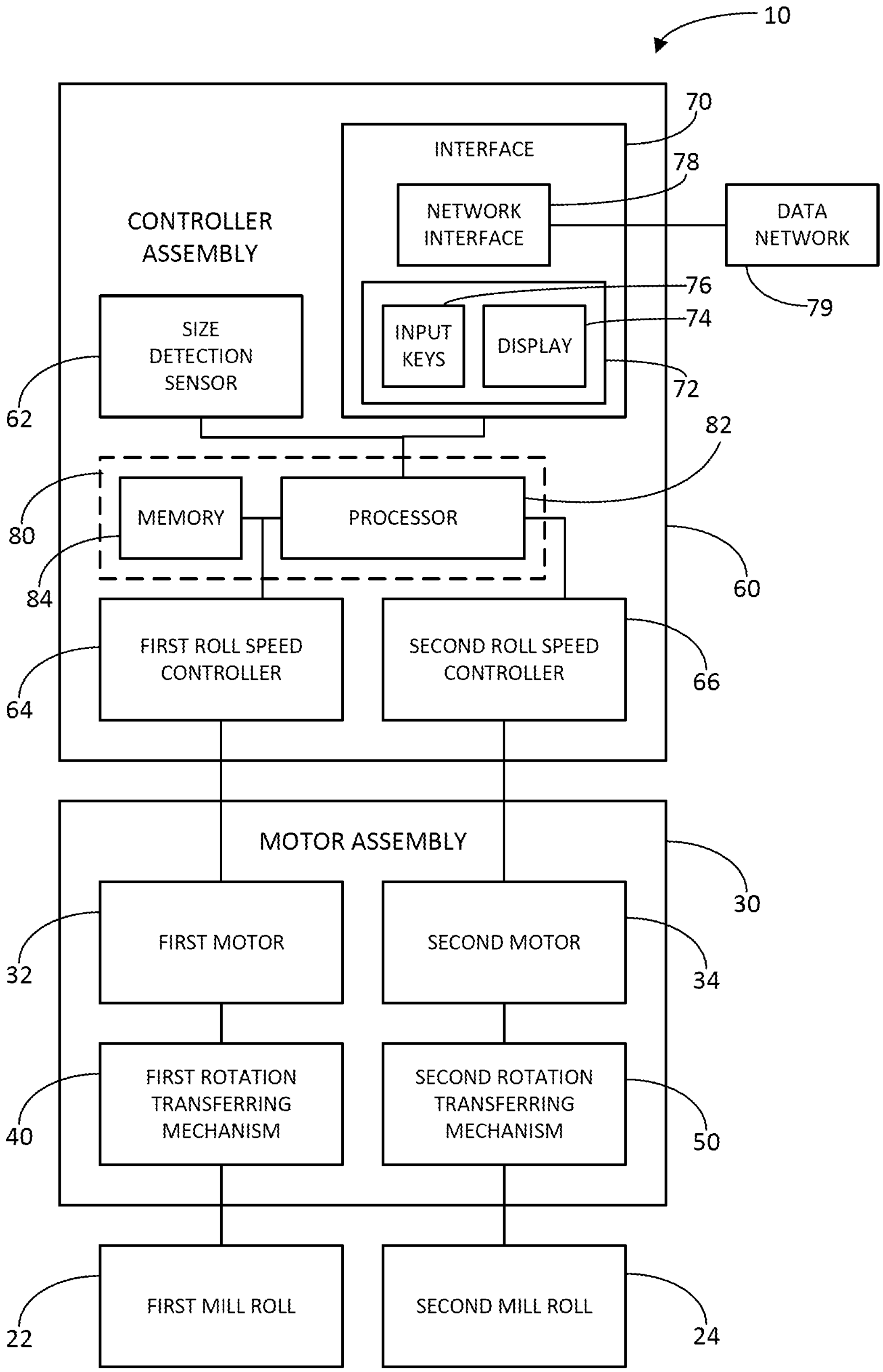
FIG. 2 is a schematic diagram of selected elements of the milling apparatus, according to an illustrative embodiment.
Figure 3:
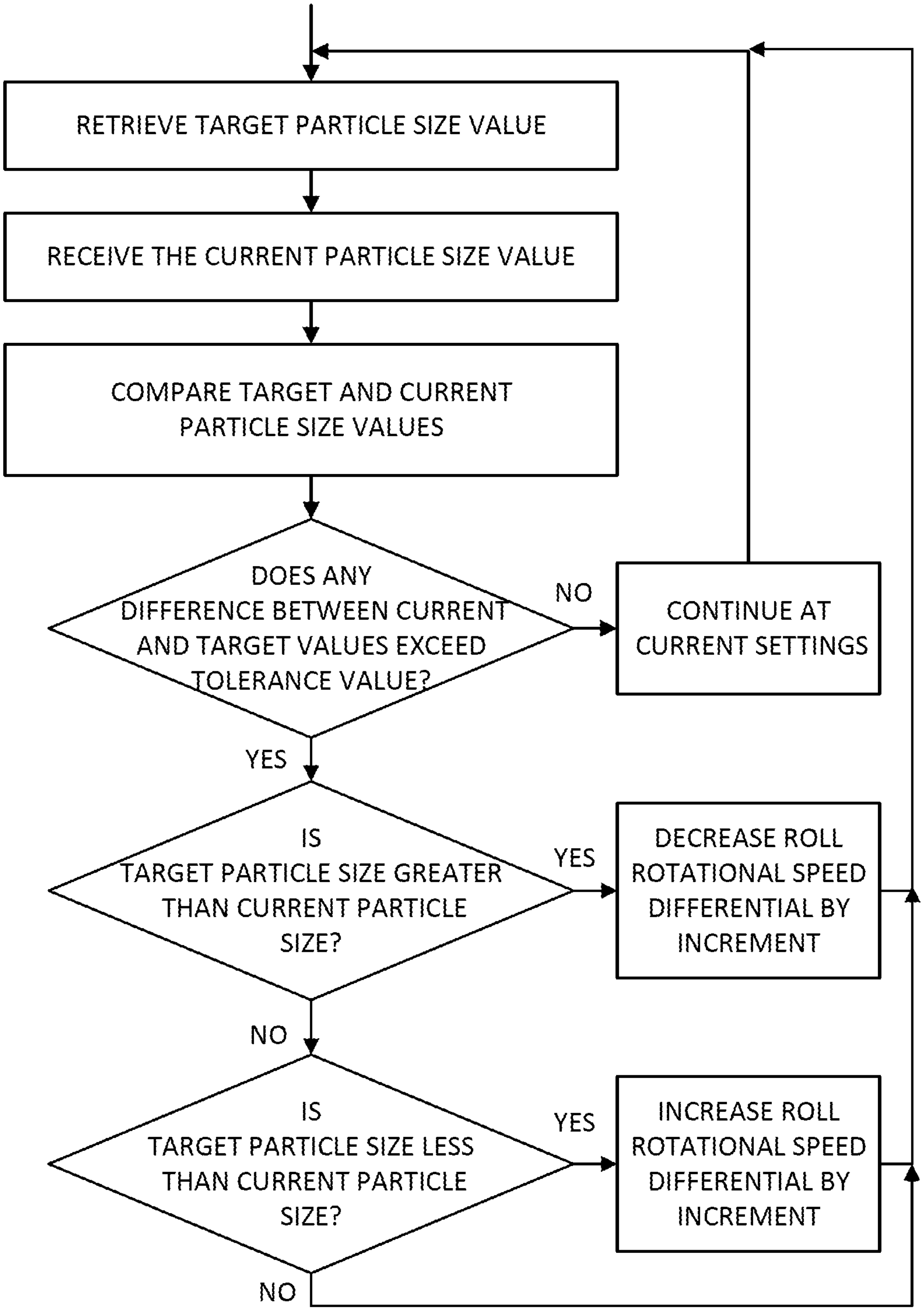
FIG. 3 is a schematic flow diagram of aspects of a method of using a milling apparatus, according to an illustrative implementation.

With reference now to the drawings, and in particular to FIGS. 1 through 3 thereof, a new milling apparatus and method embodying the principles and concepts of the disclosed subject matter will be described.

The applicants have recognized the advantageousness of using the relative rotational speeds of mill rolls of a roller mill apparatus, and more specifically the magnitude of the speed differential between the rotational speeds, to adjust the size of the particles being produced by the apparatus, particularly to move the particle size realized toward a target particle size.

In some aspects, disclosure relates to a system 10 for grinding particulate material, and the particulate material may further be comprised of a plurality of particles. Illustratively, the particles may comprise grain particles, but those skilled in the art may recognize the applicability of the disclosure to other types of particles.

The system 10 may generally include a roller mill apparatus 12 which is configured to mill or grind particulate material passing through the roller mill apparatus to reduce the size of the particles as the particles pass through the apparatus. The roller mill apparatus 12 may have a roller mill input, which may be defined by an input opening, into which the particles of the particulate material are introduced into the apparatus 12, typically without further significant processing before reaching the grinding rolls. The roller mill apparatus 12 may also have a roller mill output, which may be defined by an output opening, from which the particles move after passing between it least one pair of the grinding rolls. Illustratively, the input opening 14 may be located at a point just before the particles pass between the grinding rolls, and the output opening 16 may be located at a point just after the particles pass between the grinding rolls.

In greater detail, the roller mill apparatus 12 may comprise a roller mill frame 20 for supporting various elements of the apparatus 12, and illustratively may define the roller mill input opening 14 and define the roller mill output opening 16. The apparatus 12 may additionally include a pair of mill rolls 22, 24 which are rotatably mounted on the roller mill frame 20 for rotation with respect to the frame 20. The mill rolls may be mounted to rotate about substantially parallel rotation axes and be positioned adjacent to each other in a manner defining a gap 26 therebetween for the passage of the particles of the particulate material being acted upon by the rolls. Illustratively, the pair of mill rolls includes a first mill roll 22 and a second mill roll 24. It will be recognized that additional pairs of mill rolls may be utilized such that the particles are acted upon by the pairs of rolls sequentially. In embodiments, at least one of the mill rolls 22, 24 have a plurality of teeth 28, and in some of the most preferred embodiments, both rolls 22, 24 have a plurality of teeth formed thereon. The teeth 28 may extend in a longitudinal direction with respect to the mill roll in an orientation substantially parallel to the rotation axis of the respective roll. In some embodiments, the teeth may be substantially continuous between opposite longitudinal ends of the roll or rolls, while in other embodiments the teeth may feature interruptions in continuity between the opposite ends.

The roller mill apparatus 12 may further include a motor assembly 30 configured to rotate the mill rolls 22, 24 with respect to the roller mill frame 20. The motor assembly 30 may comprise a first motor 32 which is operably connected to the first mill roll 22 to rotate the first mill roll with respect to the mill frame. Circuitry may be associated with the first motor 32 to permit adjustment of the first motor rotational speed to influence or adjust a first mill roll rotational speed of the first mill roll 22. The first motor may be characterized by having a current first motor rotational speed representing the rotational speed of the motor 32 at a particular (e.g., current) time.

The motor assembly 30 may also comprise a second motor 34 which is operably connected to the second mill roll 24 to rotate the mill roll 24 with respect to the mill frame 20. Circuitry may be associated with the second motor 34 to permit adjustment of the second motor rotational speed to influence or adjust a second mill roll rotational speed of the second mill roll 24. The second motor 34 may be characterized by having a current second motor rotational speed representing the rotational speed of the motor 34 at a particular (e.g., current) time.

The motor assembly 30 may further comprise a first rotation transferring mechanism 40 configured to transfer rotation of the first motor 32 to the first mill roll 22, and may be of any suitable construction, especially constructions which transfer rotation with minimal slippage. Illustratively, the first rotation transferring mechanism 40 may include a first driver pulley 42 mounted on the first motor 32, a first driven pulley 44 mounted on the first mill roll 22, and a first belt 46 entrained on the first driver pulley and the first driven pulley. The motor assembly 30 may further comprise a second rotation transferring mechanism 50 configured to transfer rotation of the second motor 34 to the second mill roll 24, and may be of any suitable construction, especially constructions which transfer rotation with minimal slippage. Illustratively, the second rotation transferring mechanism 50 may include a second driver pulley 52 mounted on the second motor 34, a second driven pulley 54 mounted on the second mill roll 24, and a second belt 56 entrained on the second driver pulley and the second driven pulley.

The roller mill apparatus 12 may further include a controller assembly 60 which is configured to control aspects of operation of elements of the roller mill apparatus. In embodiments, the controller assembly may comprise a size detection sensor 62 configured to detect a particle size associated with particles of the particulate material moving in or through the roller mill apparatus. In some implementations, the size detection sensor 62 may be configured to detect an input particle size of particles entering through the roller mill input opening 14, such as the size of particles moving into the gap 26 between the mill rolls 22, 24. In some of limitations, the size detection sensor 62 may be configured to detect an output particle size of particles passed through the gap 26 between the mill rolls, and may be configured to detect the particle size of particles passing through the roller mill output opening 16. The size detection sensor 62 may be configured to generate a particle size signal representative of a current particle size value being detected by the sensor. The size of a particle may comprise any suitable size dimension measurable with respect to a particle, or group of particles.

The controller assembly 60 of the roller mill apparatus may comprise a first roll speed controller 64 configured to influence or adjust the rotational speed of the first mill roll 22, and may do so by influencing or adjusting the rotational speed of the first motor 32. Illustratively, the first roll speed controller 64 may adjust a characteristic of electrical power supplied to the first motor to produce an adjustment of the speed of the first motor. The first roll speed controller 64 may generate a current first motor rotational speed signal which is representative of the current first motor rotational speed value.

The controller assembly 60 of the apparatus may further comprise a second roll speed controller 66 configured to influence or adjust the rotational speed of the second mill roll 24, and may do so by influencing or adjusting the rotational speed of the second motor 34. Illustratively, the second roll speed controller 66 may adjust a characteristic of electrical power supplied to the second motor to produce an adjustment of the speed of the first motor. The second roll speed controller 66 may generate a current second motor rotational speed signal which is representative of the current second motor rotational speed value.

The controller assembly 60 may also comprise an interface 70 that is configured to receive input to the roller mill apparatus, such as, for example, the desired target particle size value and optionally the acceptable tolerance value about the target particle size value that is acceptable. The interface 70 may also be configured to transmit output from the roller mill apparatus 12, and the output may include, for example, the current particle size value as well as other characteristics of the particles input to the apparatus and particles output from the apparatus.

The interface 70 may further include an operator interface device 72 which is configured to receive input information from a human operator, and the operator interface device may also be configured to communicate output information to the human operator. The operator interface device 72 may include a display 74 which is configured to display output information, and may also be configured to receive input information from the operator, such as when the display has touch sensitive characteristics. The operator interface device 72 may further include input keys 76 which are configured to receive input information from a human operator. The interface 70 may also include a network interface device 78 configured to receive input over a data communication network 79, and may also be configured to transmit output information over the network 79.

The controller assembly 60 may include processing circuitry 80 configured to perform tasks such as making a comparison between a current particle size value and a target particle size value. The processing circuitry 80 may be in communication with the size detection sensor 62. The processing circuitry 870 may be in communication with the first roll speed controller 64 to receive the current first motor rotational speed signal. The processing circuitry 80 may be in communication with the second roll speed controller 66 to receive the current second motor rotational speed signal. The processing circuitry 80 may further be in communication with the interface 70 as well as the elements of the interface. The processing circuitry 80 may include a processor 82 configured to receive the particle size signal from the size detection sensor 62, and may also include memory 84 configured to store data values such as at least one target particle size value and one or more tolerance values.

In general, the processor 82 may be configured to compare the current particle size value to the target particle size value and issue commands or instructions based upon the results of the comparison. In illustrative implementations, the processor 82 may execute a program of instructions which may include various steps or actions. In exemplary operations, the processor 82 may execute instructions including retrieving the target particle size value from the memory 84 or other location, and receiving the current particle size value from the size detection sensor 62. The processor 82 may execute further instructions including comparing the current particle size value to the target particle size value, including, for example, determining if there is a difference between the current particle value and the target particle size value, and if a difference exists, whether the difference is greater than, or equal to or greater than, a tolerance value for the difference in target and current measured particle size values.

In implementations, the processor 82 may execute instructions involving determining if the difference between the current particle size value and the target particle size value equals and/or exceeds the tolerance value, and if not, then continuing the current first motor rotational speed of the first motor and the current second motor rotational speed of the second motor, or a current differential in the rotational speeds of the motors, typically with no change to the operation of the motors or the associated controls. If the difference between the current particle size value and the target particle size value size is greater than the tolerance value, then the processor may take step(s) to determine how the target and current particle sizes compare, and take step(s) accordingly.

In implementations, the processor 82 may executes instructions involving determining if the target particle size value is greater than the current particle size value, then the processor may take step(s) to decrease a motor rotational speed differential value between the current first motor rotational speed and the current second motor rotational speed by an increment value, such as by a predetermined number of revolutions per minute. The decrease in the rotational speed differential may be accomplished in any suitable manner, including, for example, increasing the rotational speed of a slower rotating motor while maintaining the rotational speed of a faster rotating motor, or decreasing the rotational speed of a faster rotating motor while maintaining the rotational speed of a slower rotating motor. Optionally, the rotational speeds of the motors may both be adjusted, either faster or slower, in a manner such that the differential is decreased.

In implementations, if the target particle size value is less than the current particle size value, then the processor may take step(s) to increase the motor rotational speed differential value between the current first motor rotational speed and the current second motor rotational speed by an increment value, such as by a predetermined number of revolutions per minute. The increase in the rotational speed differential may be accomplished in any suitable manner, including, for example, increasing the rotational speed of a faster rotating motor while maintaining the rotational speed of a slower rotating motor, or decreasing the rotational speed of a slower rotating motor while maintaining the rotational speed of a faster rotating motor. Optionally, the rotational speeds of the motors may both be adjusted, either faster or slower, in a manner such that the differential is increased.

Portions of, or the entirely of, the actions of the program may be repeated in a continuous or periodic manner to further monitor the particle size and adjust characteristics of the operation of the motors based upon the observed current particle sizes.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for grinding particulate material comprised of particles, the system comprising:

a roller mill apparatus configured to grind particulate material passing through the roller mill apparatus, the roller mill apparatus comprising:

a roller mill frame; and a pair of mill rolls rotatably mounted on the roller mill frame for rotation with respect to the roller mill frame, a gap being formed between the pair of mill rolls through which the particulate material passes;

a motor assembly configured to rotate each of the mill rolls with respect to the roller mill frame such that each of the mill rolls has a rotational speed;

a controller assembly configured to control aspects of operation of the roller mill apparatus, the controller assembly comprising:

a size detection sensor configured to detect a particle size associated with particles of the particulate material passed through the gap between the pair of mill rolls;

processing circuitry configured to compare a current particle size value with a target particle size value, the processing circuitry being configured to execute instructions to:

compare the current particle size value to the target particle size value; and adjust a magnitude of a differential in rotational speeds of the mill rolls, the magnitude of adjustment being based upon the comparison of the current particle size value to the target particle size value to cause a future said current particle size value to move closer to the target particle size value, the processing circuitry being configured to execute instructions to:

if the target particle size value is greater than the current particle size value, then cause the motor assembly to decrease a motor rotational speed differential value between the rotational speeds of the mill rolls by an increment value; and if the target particle size value is less than the current particle size value, then cause the motor assembly to increase the motor rotational speed differential value between the rotational speeds of the mill rolls by an increment value.

2. The system of claim 1 wherein the processing circuitry is configured to execute instructions to:

retrieve the target particle size value from a memory associated with the roller mill apparatus; and receive the current particle size value from the size detection sensor.

3. The system of claim 1 wherein the processing circuitry is configured to execute instructions to:

determine if a difference between the current particle size value and the target particle size value is equal to or greater than a tolerance value.

4. The system of claim 3 wherein the processing circuitry is configured to execute instructions to:

if the difference between the current particle size value and the target particle size value is less than or equal to the tolerance value, then continue a current rotational speed of each of the mill rolls.

5. The system of claim 1 wherein the processing circuitry is configured to execute instructions to:

if the difference between the current particle size value and the target particle size value size is greater than the tolerance value, then cause the adjusting of the magnitude of any differential in the rotational speeds of the mill rolls.

6. The system of claim 5 wherein the processing circuitry is configured to execute instructions to:

determine if the target particle size value is greater than the current particle size value, and determine if the target particle size value is less than the current particle size value.

7. The system of claim 6 wherein the controller assembly additionally comprises a roll speed controller configured to adjust the rotational speed of at least one of the mill rolls; and wherein the processing circuitry is configured to execute instructions to:

if the target particle size value is greater than the current particle size value, then cause the roll speed controller to decrease the motor rotational speed differential value between the rotational speeds of the mill rolls by an increment value; and if the target particle size value is less than the current particle size value, then cause the roll speed controller to increase the motor rotational speed differential value between the rotational speeds of the mill rolls by an increment value.

8. The system of claim 7 wherein the roll speed controller of the controller assembly comprises a first roll speed controller configured to control a first motor of the motor assembly to thereby influence a rotational speed of a first roll of the pair of mill rolls.

9. The system of claim 8 wherein the controller assembly additionally comprises a second roll speed controller configured to control a second motor of the motor assembly to thereby influence a rotational speed of a second roll of the pair of mill rolls.

10. The system of claim 1 wherein the controller assembly additionally comprises an interface configured to receive input to the roller mill apparatus, the input including the target particle size value, the interface being configured to transmit output from the roller mill apparatus, the output including the current particle size value.

11. The system of claim 10 wherein the interface of the controller assembly comprises:

an operator interface device configured to receive input information from a human operator and to communicate output information to the human operator.

12. The system of claim 10 wherein the interface of the controller assembly comprises:

a network interface device configured to communicate data over a data communication network.

13. A method of operating a roller mill apparatus including a pair of rotatable mill rolls defining a gap therebetween through which particulate material is passed, the method comprising:

retrieving a target particle size value;

receiving a current particle size value from a size detection sensor of the roller mill apparatus, determining if a difference between the current particle size value and the target particle size value is equal to or greater than a tolerance value, the determining step including determining if the target particle size value is greater than the current particle size value, and determining if the target particle size value is less than the current particle size value;

if the difference between the current particle size value and the target particle size value is less than or equal to the tolerance value, then continuing a current rotational speed of each of the mill rolls; and if the difference between the current particle size value and the target particle size value size is greater than the tolerance value, then adjusting the magnitude of any differential in the rotational speeds of the mill rolls, the adjusting step including:

if the target particle size value is greater than the current particle size value, then causing a roll speed controller of the roller mill apparatus to decrease a motor rotational speed differential value between the rotational speeds of the mill rolls by an increment value; and if the target particle size value is less than the current particle size value, then causing the roll speed controller to increase the motor rotational speed differential value between the rotational speeds of the mill rolls by an increment value.

14. The method of claim 13 wherein retrieving the target particle size value includes retrieving the target particle size value from a memory associated with the roller mill apparatus.

15. The method of claim 13 wherein retrieving the target particle size value includes retrieving the target particle size value from an interface including a network interface device configured to communicate data over a data communication network.

* * * * *